(12) United States Patent
Megaro et al.

(10) Patent No.: US 12,548,247 B2
(45) Date of Patent: Feb. 10, 2026

(54) DECOMPOSING AND RECOMPOSING SCENES USING NEURAL RADIANCE FIELDS

(71) Applicant: DISNEY ENTERPRISES, INC., Burbank, CA (US)

(72) Inventors: Martina Megaro, Ostermundigen (CH); Abdelaziz Djelouah, Zurich (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 187 days.

(21) Appl. No.: 18/476,167

(22) Filed: Sep. 27, 2023

(65) Prior Publication Data

US 2025/0104343 A1 Mar. 27, 2025

(51) Int. Cl.
*G06T 17/00* (2006.01)
*G06T 7/90* (2017.01)
*G06V 10/25* (2022.01)

(52) U.S. Cl.
CPC ............ *G06T 17/00* (2013.01); *G06T 7/90* (2017.01); *G06V 10/25* (2022.01); *G06T 2207/10024* (2013.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 2020/0082541 A1* | 3/2020 | Jouppi | .................... | G06T 7/194 |
| 2021/0012486 A1* | 1/2021 | Huang | .................... | G06N 3/047 |
| 2023/0215085 A1* | 7/2023 | Olszewski | ................ | G06T 7/80 |
| | | | | 345/426 |
| 2024/0087214 A1* | 3/2024 | Martin Brualla | .... | H04N 13/111 |
| 2024/0193850 A1* | 6/2024 | Kuang | .................... | G06T 15/08 |
| 2024/0202987 A1* | 6/2024 | Sadr | ........................ | G06T 11/00 |
| 2024/0355042 A1* | 10/2024 | Fang | ..................... | G06T 15/503 |
| 2024/0362793 A1* | 10/2024 | Raj | .......................... | G06T 15/06 |

OTHER PUBLICATIONS

Yang et al., "Learning object-compositional neural radiance field for editable scene rendering," Proceedings of the IEEE/CVF international conference on computer vision (Year: 2021).*

* cited by examiner

*Primary Examiner* — Anh-Tuan V Nguyen
(74) *Attorney, Agent, or Firm* — Squire Patton Boggs LLP; Sarah Mirza

(57) ABSTRACT

The present invention sets forth a technique for performing scene decomposition. This technique includes determining, based on a plurality of two-dimensional (2D) representations of a three-dimensional (3D) scene, a different radiance field function for each of a plurality of neural radiance fields (NeRFs). The technique also includes generating a combined radiance field function based on the radiance field functions associated with the plurality of NeRFs. The technique further includes generating a color value for a given 3D location and viewing angle in the 3D scene. The technique further includes computing a decomposition loss based on the difference between the color value and a ground truth color value associated with the 3D location and viewing angle. The technique further includes modifying at least one of the plurality of NeRFs based on the decomposition loss such that each NeRF is associated with a different object in the 3D scene.

14 Claims, 5 Drawing Sheets

DECOMPOSING AND RECOMPOSING SCENES USING NEURAL RADIANCE FIELDS

BACKGROUND

Field of the Various Embodiments

Embodiments of the present disclosure relate generally to machine learning and computer vision and, more specifically, to techniques for creating representations of one or more three-dimensional (3D) objects in a scene from one or more two-dimensional (2D) representations of the scene.

Description of the Related Art

Generating a 3D representation of a scene including one or more 3D objects is a common task in the fields of computer vision and computer graphics. This representation of the scene may be generated from one or more 2D representations of the scene. One goal of generating representations of a scene is the ability to generate different viewpoints of the scene. For instance, a particular 2D representation of a scene may have been captured by placing a camera at a specific location and with a specific orientation relative to the scene. The captured 2D representation can then be used to generate additional 2D representations of the scene from different camera viewpoints. Further, generating different representations of a scene also allows creators to modify the scene. For example, objects (either real or computer-generated) may be added to the scene, objects may be removed from the scene, or the relative positions of objects in the scene may be altered.

Existing techniques for generating 3D representations of scenes may make use of photogrammetry. Photogrammetry uses a collection of 2D representations of a scene along with known camera locations and orientations for each 2D representation to create a 3D model of the scene. Photogrammetry is based on the concepts of triangulation and geometry, using intersecting lines from multiple viewpoints to locate each portion of a scene in 3D space to create a 3D model of the scene.

One drawback of photogrammetry is that, because the technique is based on simple geometrical techniques, complex lighting elements such as reflections and reflective surfaces are not handled properly. As a result, photogrammetry typically is dependent on adequate and uniform lighting across the collection of 2D representations of the scene to yield desirable results. Further, photogrammetry models the entire scene as an indivisible whole and does not treat multiple objects within the scene as individual and discrete entities. This results in a rigid representation of the scene that complicates or wholly prevents subsequent editing of the scene, as objects in the scene cannot be edited, removed, or modified individually.

Other existing techniques may utilize Neural Radiance Fields (NeRFs). A NeRF is a machine learning model that is trained on a set of 2D representations of a scene taken from various camera viewpoints. Rather than generating an explicit 3D model of the scene, the output of the NeRF is a field equation that produces a color value and a volume density for any given combination of a 3D location within the scene and a viewing angle to the 3D location from a specified viewpoint within the scene.

NeRFs share a similar drawback as photogrammetry in that a single NeRF represents an entire scene as a whole. As a result, all objects in the scene are represented by a single NeRF and cannot be individually manipulated. Much like photogrammetry, this technique does not offer the flexibility needed to perform subsequent edits to the scene. As the foregoing illustrates, what is needed in the art are more effective techniques for the representation of multiple 3D objects in a scene.

SUMMARY

One embodiment of the present invention sets forth a technique for performing scene decomposition. The technique includes determining, based on a plurality of two-dimensional (2D) representations of a three-dimensional (3D) scene, a different radiance field function associated with each of a plurality of neural radiance fields (NeRFs). The technique also includes generating a combined radiance field function based on the radiance field functions associated with the plurality of NeRFs. The technique further includes generating, based on the combined radiance field function, a color value for a given 3D location and a given viewing angle from a specified viewpoint in the scene and computing a decomposition loss based on the difference between the color value and a ground truth color value associated with the 3D location and viewing angle. Further, the technique includes modifying at least one of the plurality of NeRFs based on the decomposition loss, such that each NeRF is associated with a different object in the 3D scene.

One technical advantage of the disclosed technique relative to the prior art is that the disclosed technique utilizes a plurality of NeRFs, each NeRF representing a single discrete object in a 3D scene. Unlike existing techniques that model or represent a scene as an indivisible whole rather than as a collection of discrete objects, the disclosed technique allows for simple subsequent editing, extraction, and manipulation of the individual objects in a scene.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
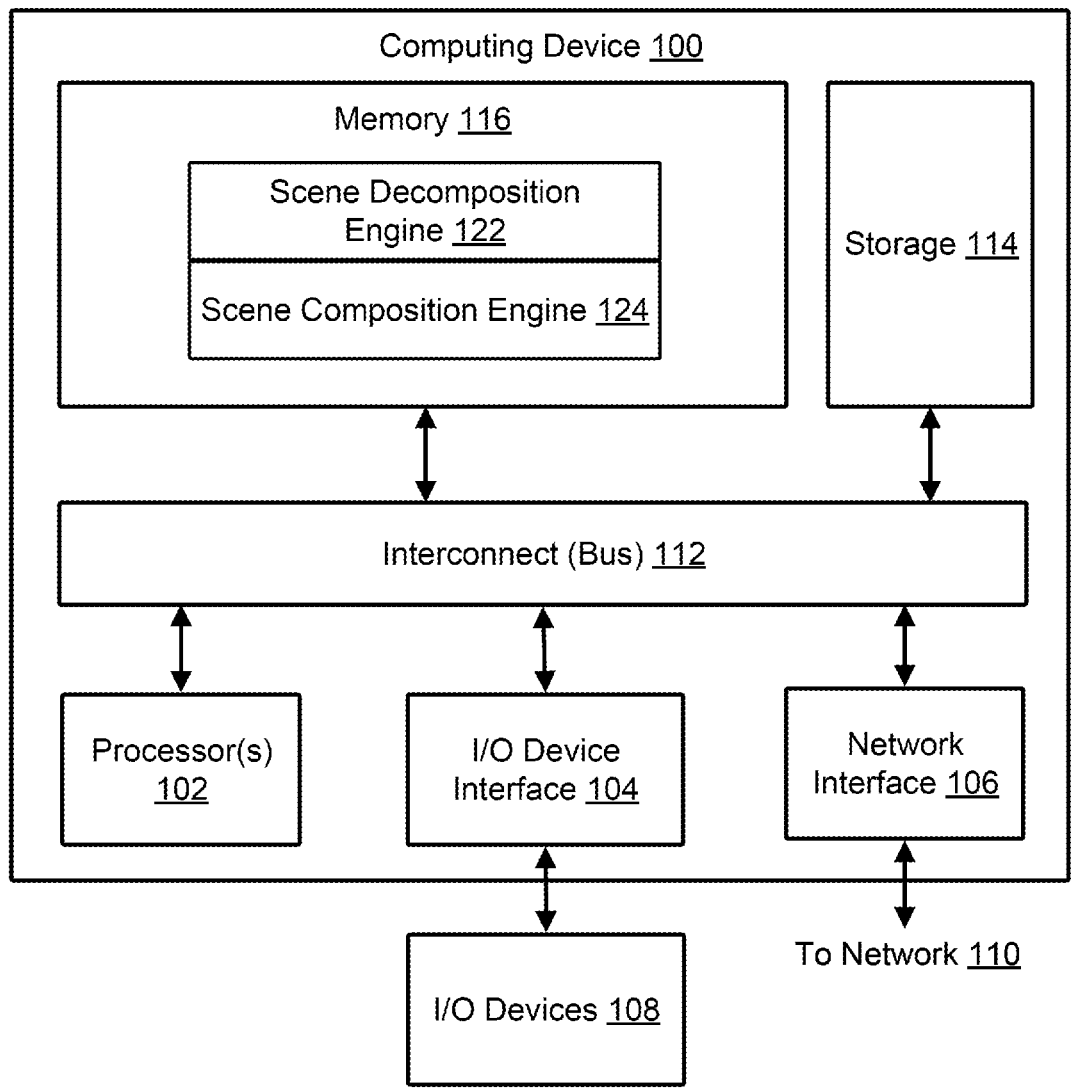
FIG. 1 illustrates a computer system configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a scene decomposition engine 122 and a scene composition engine 124 that reside in a memory 116.

It is noted that the computing device described herein is illustrative and that any other technically feasible configurations fall within the scope of the present disclosure. For example, multiple instances of scene decomposition engine 122 and scene composition engine 124 could execute on a set of nodes in a distributed and/or cloud computing system to implement the functionality of computing device 100. In another example, scene decomposition engine 122 and/or scene composition engine 124 could execute on various sets of hardware, types of devices, or environments to adapt scene decomposition engine 122 and/or scene composition engine 124 to different use cases or applications. In a third example, scene decomposition engine 122 and scene composition engine 124 could execute on different computing devices and/or different sets of computing devices.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Scene decomposition engine 122 and scene composition engine 124 may be stored in storage 114 and loaded into memory 116 when executed.

Memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including scene decomposition engine 122 and scene composition engine 124.

In some embodiments, scene decomposition engine 122 trains one or more machine learning models to perform 3D scene decomposition. Scene decomposition engine 122 trains one or more machine learning models on a dataset of 2D rendered representations of a 3D scene. After training, at least one of the trained machine learning models represents each object in the scene. The combined output of the one or more trained machine learning models is a radiance field function. Given a 3D location within the scene and a viewing angle to the location from a specified viewpoint in the scene, the radiance field function returns a color value and a volume density value. By repeatedly applying the radiance field function to every 3D location in the scene, the technique may produce 2D renderings of the scene from any specified viewpoint, including novel viewpoints not included in the training dataset.

More specifically, scene decomposition engine 122 is configured to analyze multiple 2D renderings of a scene and to train multiple neural radiance fields (NeRFs), each trained NeRF representing a single object in the scene. The combined output of the trained NeRFs is a radiance field function that can generate novel 2D renderings of any portion of the scene from any specified viewpoint. The input to scene decomposition engine 122 optionally includes additional information regarding the scene such as segmentation masks or appearance, occupancy, or shape information. Scene composition engine 124 is configured to analyze one or more previously trained NeRFs, each previously trained NeRF representing a different object in a scene, and to generate a single NeRF that represents the entire scene and all of the objects in the scene.

Scene Decomposition

Figure 2:
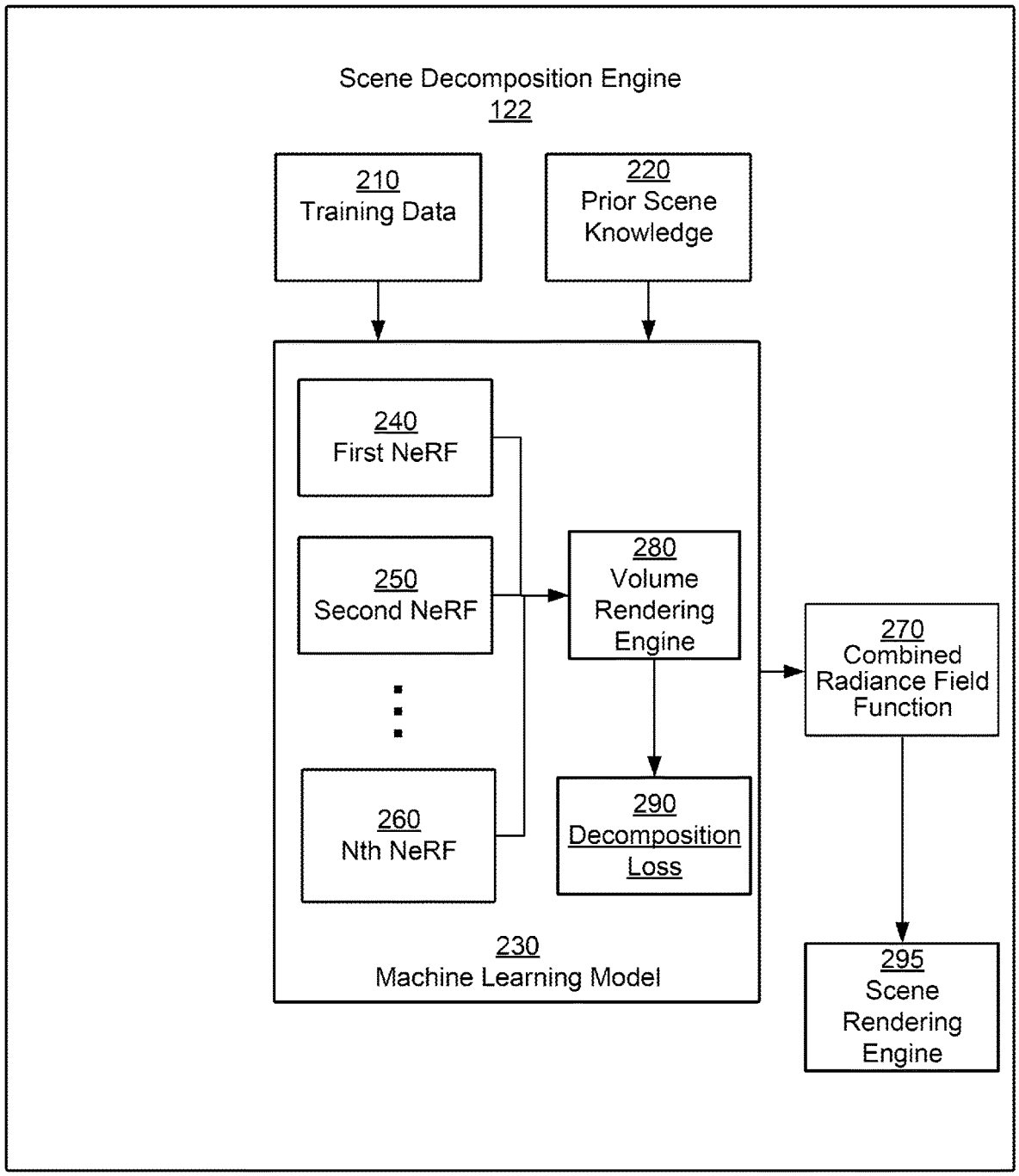
FIG. 2 is a more detailed illustration of scene decomposition engine 122 of FIG. 1, according to some embodiments.

FIG. 2 is a more detailed illustration of scene decomposition engine 122 of FIG. 1, according to some embodiments. Scene decomposition engine 122 trains machine learning model 230 on multiple 2D renderings of a 3D scene to generate a combined radiance field function 270. Combined radiance field function 270 generates, for any given 3D location in the scene and viewing angle, a color value and a volume density value for the 3D location that specifies the opacity of the volume centered at the given 3D location. As shown, scene decomposition engine 122 further includes multiple neural radiance fields (NeRFs 240, 250, 260), training data 210, prior scene knowledge 220, volume rendering engine 280, decomposition loss 290 and scene rendering engine 295.

Training data 210 comprises multiple 2D renderings of a single scene including one or more objects. Each 2D rendering further includes associated ground truth data for the rendering, including color values associated with paired 3D locations and viewing angles within the scene.

Machine learning model 230 includes a plurality of NeRFs (240, 250, 260). In various embodiments, the number of NeRFs in machine learning model 230 is equal to the number of discrete objects in the 3D scene. A NeRF has an associated radiance field function that maps a 3D scene location (x,y,z) and viewing directions (θ,φ) to a color value c and a volume density σ. The viewing directions θ and φ represent horizontal and vertical angular measurements respectively from a specified viewpoint to the 3D scene location. The radiance field function is expressed as:

$$f_\Theta : \gamma(x,y,z,\theta,\varphi) \to (c, \sigma)$$

where Θ represents the trainable parameters of the NeRF such as weight values for individual nodes within the NeRF and γ represents any transformation applied to the 3D location and viewing orientation.

The radiance field function may be used to generate a 2D representation of the scene via volume rendering, based on a given location in the scene and a directional viewing ray to the location from a specified viewpoint. The volume rendering determines a color value for each pixel in the 2D representation and is shown by $c(p,r,f_\Theta)$, where p denotes a specific location in the scene, r represents a directional viewing ray, and $f_\Theta$ represents the radiance field function.

Training optimizes a neural radiance field by minimizing the difference between color values produced by the neural radiance field and ground truth color value data from a set of 2D training images of a scene. The differences may be expressed as a mean squared error loss given by:

$$\mathcal{L}_{MSE} = \sum_{(p,r) \text{in } \mathcal{R}} \| c(p, r, f\Theta) - c_{GT}(p, r) \|^2$$

where $\mathcal{R}$ is the set of pixels and viewing directions available from the training images and $c_{GT}$ is the ground truth color value from the training images for a particular (3D location, viewing ray) pair. In various embodiments, losses may be evaluated using any suitable reconstruction loss function (e.g. L1 loss or feature losses).

Scene decomposition engine 122 jointly trains the multiple NeRFs (240, 250, 260) on the training data 210. As a non-limiting example with a 3D scene including two discrete objects, machine learning model 230 comprises two NeRFs: first NeRF 240 and second NeRF 250. Scene decomposition engine 122 jointly trains the two NeRFs in machine learning model 230 by minimizing a decomposition loss 290 that includes terms from both NeRFs:

$$\mathcal{L}_{MSE} = \sum_{(p,r) \text{in } \mathcal{R}} \| (c(p, r, f\Theta_1) + c(p, r, f\Theta_2)) - c_{GT}(p, r) \|^2$$

where $f\Theta_1$ represents the radiance field function from first NeRF 240 and $f\Theta_2$ represents the radiance field function from second NeRF 250. Volume rendering engine 280 generates color values $c(p,r,f\Theta_1)$ and $c(p,r,f\Theta_2)$ for locations and viewing rays in the scene based on the radiance field functions of first NeRF 240 and second NeRF 250 respectively. Ground truth color values from training data 210 are represented by $c_{GT}(p,r)$, and $\mathcal{R}$ represents the set of paired 3D locations p and directional rays r available in training data 210. Decomposition loss 290 may be calculated with any suitable reconstruction loss function.

The above loss function is minimized when, for each (p,r) in $\mathcal{R}$, the contribution from one NeRF (either $c(p,r,f\Theta_1)$ or $c(p,r,f\Theta_2)$) closely matches the ground truth value $c_{GT}(p,r)$ while the contribution from the other NeRF is zero or close to zero. At the conclusion of training, the radiance field function $f\Theta_1$ from first NeRF 240 is associated with one discrete object in the 3D scene, while the radiance field function $f\Theta_2$ from second NeRF 250 is associated with a different discrete object in the 3D scene. Each NeRF and its associated discrete object may then be individually edited, modified, or deleted.

Scene decomposition engine 122 generates combined radiance field function 270 from a summation of the individual NeRF radiance field functions $f\Theta_1$ and $f\Theta_2$. Scene rendering engine 295 may then apply combined radiance field function 270 to any given combination of 3D location p and directional viewing ray r in the scene to generate novel views of the scene.

While the above example demonstrates decomposing a 3D scene with two discrete objects using two NeRFs 240 and 250, the disclosed technique may be extended to decompose 3D scenes with any number of discrete objects and to generate novel views of the decomposed scene.

In some embodiments, scene decomposition engine 122 may apply prior scene knowledge 220 to guide and inform the training of machine learning model 230. Prior scene knowledge 220 may include input image segmentation, where training data 210 includes segmentation masks for one or more objects in one or more of the input 2D representations. A segmentation mask is an explicit association between objects and pixel locations in the 2D representation. Scene decomposition engine 122 applies the segmentation mask to decomposition loss 290 to cancel out the contribution of one or more NeRFs when appropriate. In some embodiments, scene decomposition engine 122 only considers pixels located relatively far from the borders of the segmentation mask when explicitly canceling the contributions of the one or more NeRFs. For pixels that are located closer to the borders of the segmentation masks, scene decomposition engine 122 may rely on the individual NeRFs to automatically adjust their contributions to the decomposition loss function 290 during training.

In some embodiments where the scene includes only non-overlapping objects, scene decomposition engine 122 may predict one or more segmentation masks for the 2D representations in training data 210. As described above, scene decomposition engine 122 may use the predicted segmentation mask(s) to cancel the contributions of individual NeRFs in decomposition loss 290 as appropriate. Further, scene decomposition engine 122 may apply an additional regularization term to decomposition loss 290 to push the predicted segmentation mask(s) to be binary. This additional regularization enforces the constraint that any particular pixel location in a 2D representation depicting solid objects may be occupied by at most one object.

Still assuming a scene depicting non-overlapping objects, scene decomposition engine 122 may also optimize a voxel segmentation mask denoting a contiguous region of 3D locations in the scene, encouraging each 3D location in the scene to only be occupied by one NeRF at a time.

When minimizing decomposition loss 290, scene decomposition engine 122 may utilize any known appearance priors for one or more objects in the scene. Given an appearance distribution prior $P_{A1}$ for the first object in a scene, scene decomposition engine 122 may incorporate an additional loss term based on this prior:

$$\mathcal{L}_{A1} = \sum_{(p,r) in \mathcal{R}} -\log P_{A1}(c(p, r, f\Theta_1))$$

Scene decomposition engine 122 may further leverage any available priors in terms of the shape or 3D location of one or more objects in the scene. Given a shape prior $P_{S1}$ describing the shape or location of the first object in a scene, scene decomposition engine 122 may incorporate an additional loss term in decomposition loss 290 based on this prior:

$$\mathcal{L}_{S1} = \sum_{(p,r) in \mathcal{R}} -\log P_{S1}(\sigma(p, r, f\Theta_1))$$

Scene Composition

Figure 3:
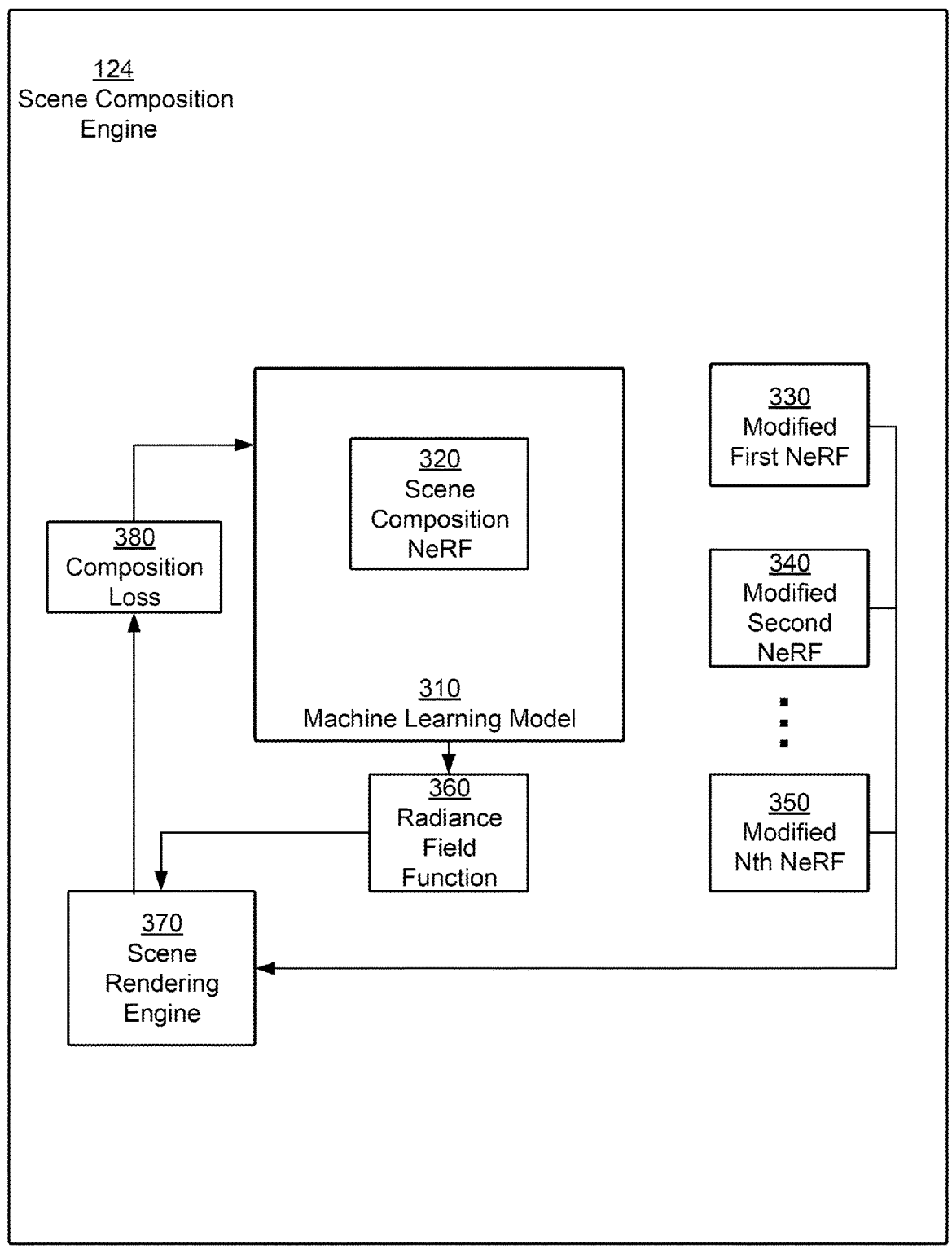
FIG. 3 is a more detailed illustration of scene composition engine 124 of FIG. 1, according to some embodiments.

FIG. 3 is a more detailed illustration of scene composition engine 124 of FIG. 1, according to some embodiments. Scene composition engine 124 trains a machine learning model on multiple NeRFs, each NeRF representing a discrete object in a scene. During training, scene composition engine 124 modifies the parameters of a single composite NeRF that represents the entire scene. Optionally, scene composition engine 124 may modify, add, duplicate, or remove multiple NeRFs representing individual objects before combining the multiple NeRFs into a single NeRF. After training, scene composition engine 124 applies a scene rendering engine to this single NeRF to generate 2D renderings of the scene more efficiently than rendering multiple individual NeRFs. As shown, scene composition engine 124 includes modified NeRFs (330, 340, 350), machine learning model 310, scene composition NeRF 320, radiance field function 360, scene rendering engine 370, and composition loss 380.

Scene composition engine 124 trains machine learning model 310 to generate scene composition NeRF 320. Scene composition NeRF 320 is a single NeRF model representing a scene depicting one or more objects. Radiance field function 360 is the field function associated with scene composition NeRF 320 and is denoted by $\Theta_F$.

In a non-limiting example where scene composition NeRF 320 composes two discrete objects into a single scene, scene composition engine 124 trains machine learning model 310 by minimizing composition loss 380:

$$\mathcal{L}_{MSE} = \sum_{(p,r) in \mathcal{R}} \|(c(p, r, f\Theta_F) - (c(p, r, f\Theta_1) + c(p, r, f\Theta_2)))\|^2$$

Where $c(p,r,f\Theta_F)$ is a color value for a particular 3D location and viewing ray in the composited 3D scene based on radiance field function 360. Terms $c(p,r,f\Theta_1)$ and $c(p,r,f\Theta_2)$ are color values for the same location and viewing ray based on the radiance field functions of modified first NeRF 330 and modified second NeRF 340, respectively. Composition loss 380 is minimized when the color value contribution from scene composition NeRF 320 is equal or nearly equal to the summed color value contributions from modified first NeRF 330 and modified second NeRF 340. The various color values are generated by scene rendering engine 370 based on the radiance field functions of the associated NeRFs ($\Theta_F, \Theta_1, \Theta_2$).

After training is complete, scene rendering engine 370 may generate 2D representations of the composited 3D scene for any 3D location in the scene and viewing ray based on radiance field function 360.

While the above example demonstrates composing a 3D scene depicting two objects using two modified NeRFs 330 and 340, the disclosed technique may be extended to compose 3D scenes with any number of discrete objects and to generate arbitrary views of the composed scene.

Figure 4:
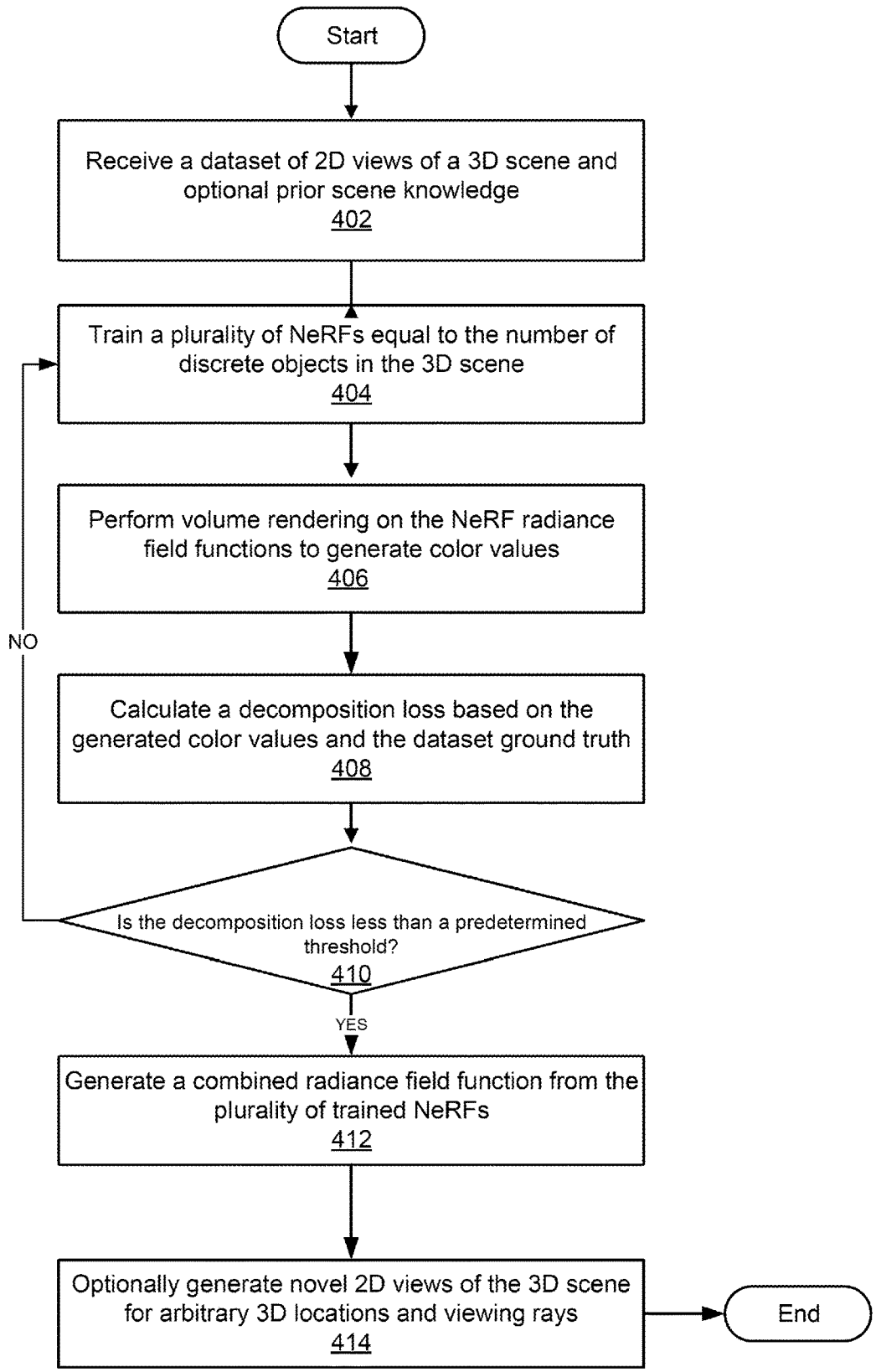
FIG. 4 is a flow diagram of method steps for performing scene decomposition of a 3D scene, according to various embodiments.

FIG. 4 is a flow diagram of method steps for performing scene decomposition of a 3D scene, according to various embodiments. Although the method steps are described in conjunction with the systems of FIGS. 1-3, persons skilled in the art will understand that any system configured to perform the method steps in any order falls within the scope of the present disclosure.

As shown, in operation 402, scene decomposition engine 122 receives training data 210. Training data 210 comprises multiple 2D representations of a 3D scene including one or more objects, along with ground truth data for the 2D representations. The ground truth data includes color values for various pairs (3D location, viewing ray) in training data 210.

In various embodiments, scene decomposition engine 122 also receives prior scene knowledge 220. Prior scene knowledge 220 may include one or more segmentation masks for one or more of the 2D representations in training data 210. The segmentation masks denote specific pixels in the 2D representation that depict a particular object in the 3D scene. Prior scene knowledge 220 may further include knowledge about objects in the 3D scene in the form of appearance priors, shape priors, or location priors.

In operation 404, scene decomposition engine 122 begins training a plurality of NeRFs (240, 250, 260) in machine learning model 230. In various embodiments, the training of the plurality of NeRFs may be iterative in nature. In various embodiments, the number of NeRFs in machine learning model 230 is equal to the number of discrete objects in the 3D scene. At each iteration, scene decomposition engine 122 adjusts the parameters for each NeRF in machine learning model 230, updating a radiance field function associated with the NeRF.

In operation 406, scene decomposition engine 122 chooses a pair (3D location, viewing ray) for which training data 210 includes ground truth color information. For each NeRF in machine learning model 230, volume rendering engine 280 generates a color value for the chosen pair (3D location, viewing ray) based on the NeRF's associated radiance field function.

In operation 408, scene decomposition engine 122 calculates decomposition loss 290. Decomposition loss 290 calculates an error loss based on the difference between the sum of the color values generated from all NeRFs in machine learning model 230 and the ground truth color value from training data 210.

The training goal is to minimize decomposition loss 290. In operation 410, scene decomposition engine 122 determines whether decomposition loss 290 is below a first predetermined threshold. If decomposition loss 290 is below the first predetermined threshold, training terminates. If decomposition loss 290 is at or above the first predetermined threshold, training continues with the next pair (3D location, viewing ray) for which training data 210 includes ground truth color information.

In operation 412, after training is complete, scene decomposition engine 122 generates combined radiance field function 270. Combined radiance field function 270 is a summation of the radiance field functions associated with the plurality of NeRFs in machine learning model 230.

In operation 414, scene decomposition engine 122 optionally generates novel 2D representations of the 3D scene by applying combined radiance field function 270 to scene rendering engine 295. For a given viewpoint to the scene, scene rendering engine 295 calculates viewing rays to each 3D location in the scene. Scene rendering engine 295 applies combined radiance field function 270 to each of these pairs (3D location, viewing ray), generating a color value for the pixel in the 2D representation corresponding to the pair (3D location, viewing ray).

Figure 5:
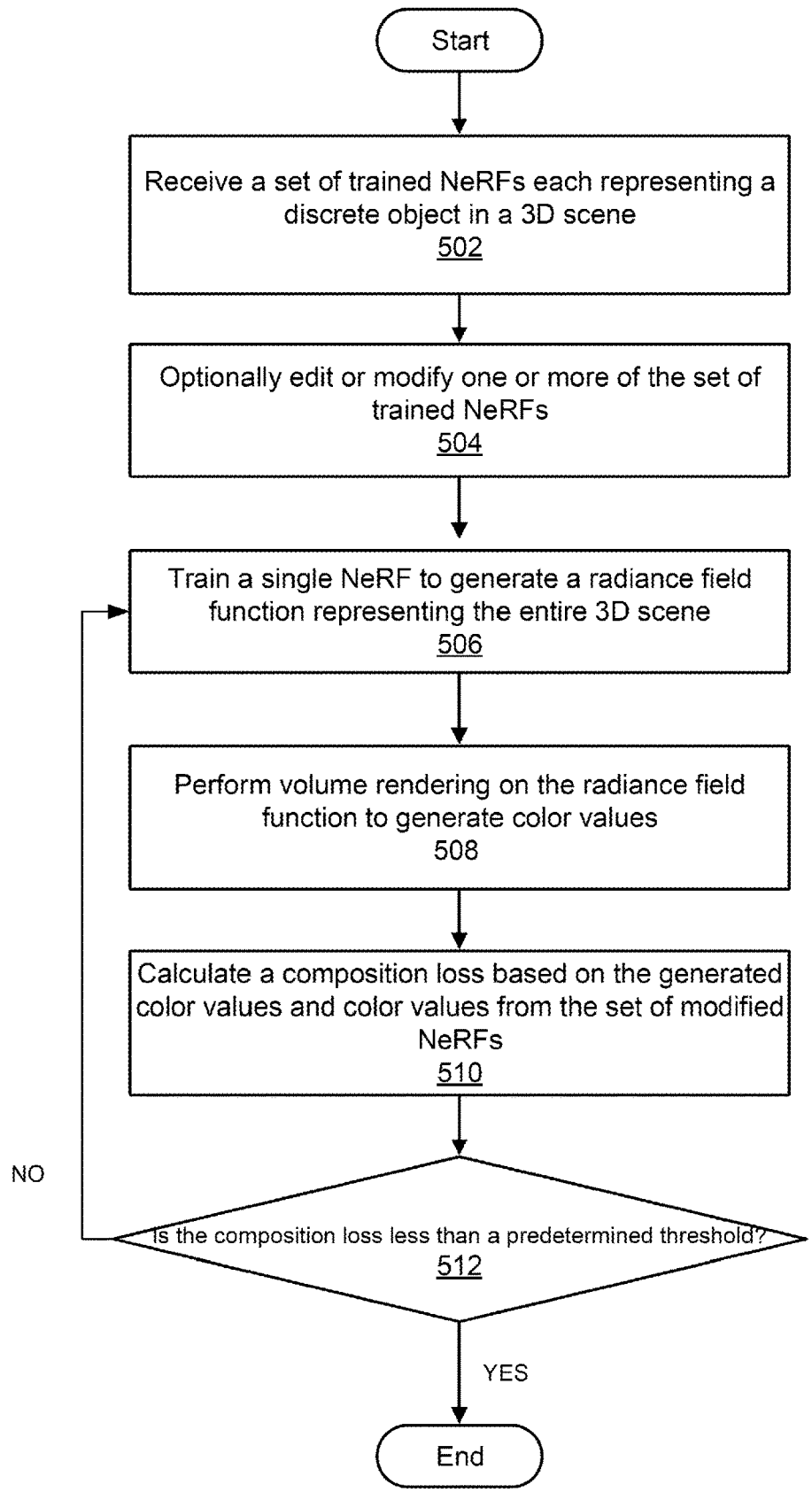
FIG. 5 is a flow diagram of method steps for performing scene composition of a 3D scene, according to various embodiments.

FIG. 5 is a flow diagram of method steps for performing scene composition of a 3D scene, according to various embodiments. Although the method steps are described in conjunction with the systems of FIGS. 1-3, persons skilled in the art will understand that any system configured to perform the method steps in any order falls within the scope of the present disclosure.

As shown, in operation 502, scene composition engine 124 receives a plurality of modified NeRFs (330, 340, 350), each NeRF representing a discrete object. In various embodiments, the plurality of NeRFs are trained as described above in reference to FIG. 2. In various other embodiments, each of the plurality of NeRFs may have been separately trained on a 3D scene including a single object. In operation 504, scene composition engine 124 may modify one or more of the individual NeRFs, including without limitation modifying the size, shape, color, orientation, or location of the object represented by the individual NeRF.

In operation 506, scene composition engine 124 begins iteratively training machine learning model 310 comprising a single scene composition NeRF 320. Scene composition NeRF 320 has an associated radiance field function 360. After training is complete, radiance field function 360 will represent a 3D scene including all of the objects represented by the individual NeRFs.

In operation 508, scene rendering engine 370 performs volume rendering on radiance field function 360. During each training iteration, scene composition engine 124 chooses a pair (3D location, viewing ray) for the 3D scene to be composed. Scene rendering engine generates a color value for the chosen pair (3D location, viewing ray) based on radiance field function 360.

In operation 510, scene composition engine 124 calculates a composition loss 380 based on the color value generated from radiance field function 360 and color values generated from the field functions associated with the plurality of modified NeRFs (330, 340, 350). Composition loss 380 calculates an error loss based on the difference between the color value generated based on radiance field function 360 and the sum of the color values generated from the radiance functions associated with modified NeRFs (330, 340, 350).

The training goal is to minimize composition loss 380. In operation 512, scene composition engine 124 determines whether composition loss 380 is below a second predetermined threshold. If composition loss 380 is below the second predetermined threshold, training terminates. If composition loss 380 is at or above the second predetermined threshold, training continues with the next pair (3D location, viewing ray) in the 3D scene.

In sum, a scene decomposition engine processes multiple 2D representations of a 3D scene to generate a radiance field function representing the scene. The radiance field function maps a 3D location within the scene and an associated viewing direction to a color value and a volume density and may be used to generate novel viewpoints for the represented 3D scene. The scene decomposition engine includes a machine learning model comprising multiple Neural Radiance Fields (NeRFs), one NeRF per object in the 3D scene. In operation, the scene decomposition engine trains all of the NeRFs jointly on a dataset of 2D representations of the 3D scene. Each 2D representation in the dataset further includes ground truth data reflecting the 3D location in the scene on which the 2D representation is based as well as a viewing direction for the 2D representation. The combined output of the plurality of NeRFs is a radiance field function representing the 3D scene. The training goal for the scene decomposition engine is to produce a radiance field function such that 2D renderings of the 3D scene from different viewpoints generated using the radiance field function match the ground truth 2D representations in the dataset. The scene decomposition engine achieves the training goal by minimizing a loss function that includes contributions from each of the plurality of NeRFs. At the conclusion of training, each of the plurality of NeRFs represents a different object from the 3D scene, and the combined radiance field function may be used to render novel 2D representations of the 3D scene focused on arbitrary locations within the scene viewed from arbitrary viewpoints.

Prior knowledge about the 3D scene may be used to guide and inform the operation of the scene decomposition engine. For example, if a segmentation mask is provided for one or more of the 2D representations in the dataset, the segmentation mask may be applied to the loss function to cancel the contributions of one or more NeRFs in the model that do not represent a particular object. Further, if the objects in the scene are assumed to be solid, the scene decomposition engine may add a regularization term to the loss function to push the predicted image masks to be binary. Still assuming solid objects, the scene decomposition engine may further optimize a voxel segmentation mask denoting a contiguous region of 3D locations in the 3D scene, encouraging every 3D region in the scene to only be associated with a single NeRF at a time. Additionally, any prior knowledge of one or more objects' appearance, location, or shape may be incorporated as additional terms in the loss function to improve the output of the scene decomposition engine.

One technical advantage of the disclosed technique relative to the prior art is that the disclosed technique utilizes a plurality of NeRFs, each NeRF representing a single discrete object in a 3D scene. Unlike existing techniques that model or represent a scene as an indivisible whole rather than as a collection of discrete objects, the disclosed technique allows for simple subsequent editing, extraction, and manipulation of the individual objects in a scene.

1. In various embodiments, a computer-implemented method comprises determining, based on a plurality of two-dimensional (2D) representations of a three-dimensional (3D) scene, a different radiance field function associated with each of a plurality of neural radiance fields (NeRFs), generating a combined radiance field function based on the radiance field functions associated with the plurality of NeRFs, generating, based on the combined radiance field function, a color value for a given 3D location and a given viewing angle in the 3D scene, computing a decomposition loss based on a difference between the color value and a ground truth color value associated with the given 3D location and the given viewing angle, and modifying at least one of the plurality of NeRFs based on the decomposition loss such that each NeRF is associated with a different object in the 3D scene.

2. The computer-implemented method of clause 1, further comprising calculating, for each of a plurality of 3D locations within the 3D scene, a corresponding viewing angle from a given viewing location, determining, for each of the plurality of 3D locations within the 3D scene, a color value and a volume density value based on the combined radiance field function, the 3D location, and the corresponding viewing angle, and generating, based on the color values and one or more volume densities for the plurality of 3D locations, a 2D representation of the 3D scene.

3. The computer-implemented method of clauses 1 or 2, further comprising receiving as input one or more input segmentation masks, wherein each input segmentation mask associates a region of pixels in one of the 2D representations with an object in the 3D scene, and adjusting the decomposition loss based on the one or more input segmentation masks to cancel contributions to the decomposition loss from one or more of the plurality of NeRFs.

4. The computer-implemented method of any of clauses 1-3, further comprising predicting one or more image segmentation masks for one or more of the 2D representations, applying an additional regularization term to the decomposition loss to push the one or more predicted image segmentation masks toward a binary representation, and adjusting the decomposition loss based on the one or more predicted segmentation masks to cancel contributions to the decomposition loss from one or more of the plurality of NeRFs.

5. The computer-implemented method of any of clauses 1-4, further comprising generating a voxel segmentation mask that denotes a contiguous region of 3D locations in the 3D scene as being associated with a single object in the 3D scene and modifying the decomposition loss such that only one of the plurality of NeRFs contributes to the decomposition loss calculated for the 3D location in the contiguous region of 3D locations.

6. The computer-implemented method of any of clauses 1-5, wherein the plurality of NeRFs includes a first NeRF and a second NeRF, and the decomposition loss is based on a sum of differences between ground truth color values and color values generated by the first NeRF and the second NeRF for a set of 3D locations and directional viewing rays depicted by the plurality of 2D representations of the 3D scene.

7. The computer-implemented method of any of clauses 1-6, further comprising modifying the decomposition loss based on a given appearance prior distribution for a first object in the 3D scene by adding a loss term to the decomposition loss, wherein the loss term includes the given appearance prior distribution for the first object in the 3D scene.

8. The computer-implemented method of any of clauses 1-7, further comprising modifying the decomposition loss based on a given shape prior distribution for a first object in the 3D scene by adding a loss term to the decomposition loss, wherein the loss term includes the given shape prior distribution for the first object in the 3D scene.

9. The computer-implemented method of any of clauses 1-8, wherein the modifying at least one of the plurality of NeRFs is performed in an iterative manner until the decomposition loss is less than a predetermined threshold value.

10. In various embodiments, one or more non-transitory computer-readable media store instructions that, when executed by one or more processors, cause the one or more processors to perform the steps of determining, based on a plurality of two-dimensional representations of a three-dimensional (3D) scene, a different radiance field function associated with each of a plurality of neural radiance fields (NeRFs), generating a combined radiance field function based on the radiance field functions associated with the plurality of NeRFs, generating, based on the combined radiance field function, a color value for a given 3D location and a given viewing angle in the 3D scene, computing a decomposition loss based on the difference between the color value and a ground truth color value associated with the given 3D location and the given viewing angle, and modifying at least one of the plurality of NeRFs based on the decomposition loss such that each NeRF is associated with a different object in the 3D scene.

11. The one or more non-transitory computer-readable media of clause 10, wherein the instructions further cause the one or more processors to perform the steps of calculating, for a given viewing location, an associated viewing angle from the viewing location to each of a plurality of 3D locations within the 3D scene, determining, for each of the plurality of 3D locations within the 3D scene, a color value and a volume density value based on the combined radiance field function, the 3D location, and the associated viewing angle, and generating, based on the color values and volume densities for the plurality of 3D locations, a 2D representation of the 3D scene.

12. The one or more non-transitory computer-readable media of clauses 10 or 11, wherein the instructions further cause the one or more processors to perform the steps of receiving as input one or more input segmentation masks, wherein each input segmentation mask associates a region of pixels in one of the plurality of 2D representations with an object in the 3D scene, and adjusting the decomposition loss based on the one or more segmentation masks to cancel contributions to the decomposition loss from one or more of the plurality of NeRFs.

13. The one or more non-transitory computer-readable media of any of clauses 10-12, wherein the instructions further cause the one or more processors to perform the steps of predicting one or more image segmentation masks for one or more of the plurality of 2D representations, applying an additional regularization term to the decomposition loss to encourage the one or more predicted image segmentation masks to be binary, and adjusting the decomposition loss based on the one or more predicted segmentation masks to cancel contributions to the decomposition loss from one or more of the plurality of NeRFs.

14. The one or more non-transitory computer-readable media of any of clauses 10-13, wherein the instructions further cause the one or more processors to perform the steps of generating a voxel segmentation mask that denotes a contiguous region of 3D locations in the 3D scene as being associated with a single object in the 3D scene, and modifying the decomposition loss such that only one of the plurality of NeRFs contributes to the decomposition loss calculated for the 3D location in the contiguous region of 3D location.
15. The one or more non-transitory computer-readable media of any of clauses 10-14, wherein the plurality of NeRFs includes a first NeRF and a second NeRF, and the decomposition loss is based on a sum of differences between ground truth color values and color values generated by the first NeRF and the second NeRF for a set of 3D locations and directional viewing rays depicted by the plurality of 2D representations of the 3D scene.
16. The one or more non-transitory computer-readable media of any of clauses 10-15, wherein the instructions further cause the one or more processors to perform the steps of modifying the decomposition loss based on a given shape prior distribution for a first object in the 3D scene by adding a loss term to the decomposition loss, wherein the loss term includes the given shape prior distribution for the first object in the 3D scene.
17. The one or more non-transitory computer-readable media of any of clauses 10-16, wherein the instructions further cause the one or more processors to perform the steps of modifying the decomposition loss based on a given shape prior distribution for a first object in the 3D scene by adding a loss term to the decomposition loss, wherein the loss term includes the given shape prior distribution for the first object in the 3D scene.
18. The one or more non-transitory computer-readable media of any of clauses 10-16, wherein the modifying at least one of the plurality of NeRFs is performed in an iterative manner until the decomposition loss is less than a predetermined threshold value.
19. In various embodiments, a computer-implemented method comprises modifying a single neural radiance field (NeRF) based on a given plurality of NeRFs, each of the plurality of NeRFs representing a discrete object in a 3D scene, and generating, based on the modified single NeRF, a composited 3D scene that includes each of the discrete objects represented by the plurality of NeRFs.
20. The computer-implemented method of clause 19, wherein prior to modifying the single NeRF, one or more of the given plurality of NeRFs is modified, duplicated, or removed.

Any and all combinations of any of the claim elements recited in any of the claims and/or any elements described in this application, in any fashion, fall within the contemplated scope of the present invention and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can include or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing scene decomposition, the computer-implemented method comprising:
    determining, based on a plurality of two-dimensional (2D) representations of a three-dimensional (3D) scene, a different radiance field function associated with each of a plurality of neural radiance fields (NeRFs);
    computing, for a first 3D location and first viewing angle in the 3D scene, a decomposition loss based on a difference between a first color value generated using a first NeRF in the plurality of NeRFs and a second color value generated using a second NeRF in the plurality of NeRFs and a ground truth color value associated with the first 3D location and the first viewing angle;
    modifying at least one of the plurality of NeRFs based on the decomposition loss such that each NeRF is associated with a different object in the 3D scene, wherein, after the modifying, a contribution of the first NeRF to a first object in the 3D scene is minimized relative to a contribution of the second NeRF to the first object in the 3D scene;
    generating a combined radiance field function based on the radiance field functions associated with the plurality of NeRFs; and
    generating, based on the combined radiance field function, a color value for a given 3D location and a given viewing angle in the 3D scene.

2. The computer-implemented method of claim 1, further comprising:
    calculating, for each of a plurality of 3D locations within the 3D scene, a corresponding viewing angle from a given viewing location;
    determining, for each of the plurality of 3D locations within the 3D scene, a color value and a volume density value based on the combined radiance field function, the 3D location, and the corresponding viewing angle; and
    generating, based on the color values and one or more volume densities for the plurality of 3D locations, a 2D representation of the 3D scene.

3. The computer-implemented method of claim 1, further comprising:
    receiving as input one or more input segmentation masks, wherein each input segmentation mask associates a region of pixels in one of the 2D representations with an object in the 3D scene; and
    adjusting the decomposition loss based on the one or more input segmentation masks to cancel contributions to the decomposition loss from one or more of the plurality of NeRFs.

4. The computer-implemented method of claim 1, further comprising:
    predicting one or more image segmentation masks for one or more of the 2D representations;
    applying an additional regularization term to the decomposition loss to push the one or more predicted image segmentation masks toward a binary representation; and
    adjusting the decomposition loss based on the one or more predicted segmentation masks to cancel contributions to the decomposition loss from one or more of the plurality of NeRFs.

5. The computer-implemented method of claim 1, further comprising:
    generating a voxel segmentation mask that denotes a contiguous region of 3D locations in the 3D scene as being associated with a single object in the 3D scene; and
    modifying the decomposition loss such that only one of the plurality of NeRFs contributes to the decomposition loss calculated for the 3D location in the contiguous region of 3D locations.

6. The computer-implemented method of claim 1, further comprising:
    modifying the decomposition loss based on a given appearance prior distribution for a first object in the 3D scene by adding a loss term to the decomposition loss, wherein the loss term includes the given appearance prior distribution for the first object in the 3D scene.

7. The computer-implemented method of claim 1, wherein the modifying at least one of the plurality of NeRFs is performed in an iterative manner until the decomposition loss is less than a predetermined threshold value.

8. One or more non-transitory computer-readable media storing instructions that, when executed by one or more processors, cause the one or more processors to perform the steps of:
    determining, based on a plurality of two-dimensional (2D) representations of a three-dimensional (3D) scene, a different radiance field function associated with each of a plurality of neural radiance fields (NeRFs);
    computing, for a first 3D location and first viewing angle in the 3D scene, a decomposition loss based on a difference between a first color value generated using a first NeRF in the plurality of NeRFs and a second color value generated using a second NeRF in the plurality of NeRFs and a ground truth color value associated with the first 3D location and the first viewing angle;
    modifying at least one of the plurality of NeRFs based on the decomposition loss such that each NeRF is associated with a different object in the 3D scene, wherein, after the modifying, a contribution of the first NeRF to a first object in the 3D scene is minimized relative to a contribution of the second NeRF to the first object in the 3D scene;
    generating a combined radiance field function based on the radiance field functions associated with the plurality of NeRFs; and
    generating, based on the combined radiance field function, a color value for a given 3D location and a given viewing angle in the 3D scene.

9. The one or more non-transitory computer-readable media of claim 8, wherein the instructions further cause the one or more processors to perform the steps of:
    calculating, for a given viewing location, an associated viewing angle from the viewing location to each of a plurality of 3D locations within the 3D scene;
    determining, for each of the plurality of 3D locations within the 3D scene, a color value and a volume density value based on the combined radiance field function, the 3D location, and the associated viewing angle; and
    generating, based on the color values and volume densities for the plurality of 3D locations, a 2D representation of the 3D scene.

10. The one or more non-transitory computer-readable media of claim 8, wherein the instructions further cause the one or more processors to perform the steps of:
- receiving as input one or more input segmentation masks, wherein each input segmentation mask associates a region of pixels in one of the plurality of 2D representations with an object in the 3D scene; and
- adjusting the decomposition loss based on the one or more segmentation masks to cancel contributions to the decomposition loss from one or more of the plurality of NeRFs.

11. The one or more non-transitory computer-readable media of claim 8, wherein the instructions further cause the one or more processors to perform the steps of:
- predicting one or more image segmentation masks for one or more of the plurality of 2D representations;
- applying an additional regularization term to the decomposition loss to encourage the one or more predicted image segmentation masks to be binary; and
- adjusting the decomposition loss based on the one or more predicted segmentation masks to cancel contributions to the decomposition loss from one or more of the plurality of NeRFs.

12. The one or more non-transitory computer-readable media of claim 8, wherein the instructions further cause the one or more processors to perform the steps of:
- generating a voxel segmentation mask that denotes a contiguous region of 3D locations in the 3D scene as being associated with a single object in the 3D scene; and
- modifying the decomposition loss such that only one of the plurality of NeRFs contributes to the decomposition loss calculated for the 3D location in the contiguous region of 3D location.

13. The one or more non-transitory computer-readable media of claim 8, wherein the instructions further cause the one or more processors to perform the step of:
- modifying the decomposition loss based on a given shape prior distribution for a first object in the 3D scene by adding a loss term to the decomposition loss, wherein the loss term includes the given shape prior distribution for the first object in the 3D scene.

14. The one or more non-transitory computer-readable media of claim 8, wherein the modifying at least one of the plurality of NeRFs is performed in an iterative manner until the decomposition loss is less than a predetermined threshold value.

* * * * *